Aug. 7, 1956  C. A. HUGGINS  2,757,915
GAS-LIQUID CONTACT APPARATUS
Filed Aug. 23, 1951  4 Sheets-Sheet 1
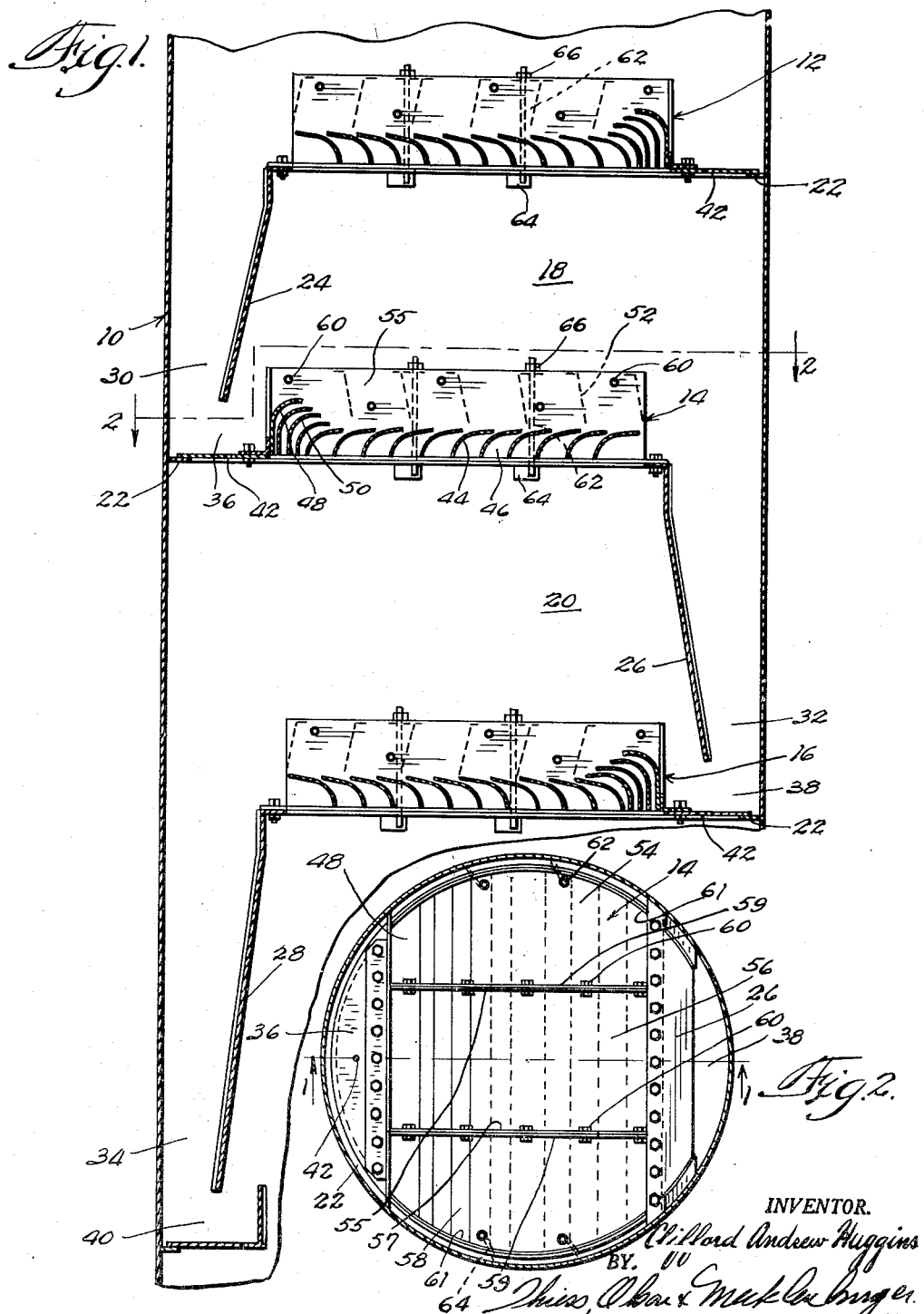
INVENTOR.
Willard Andrew Huggins

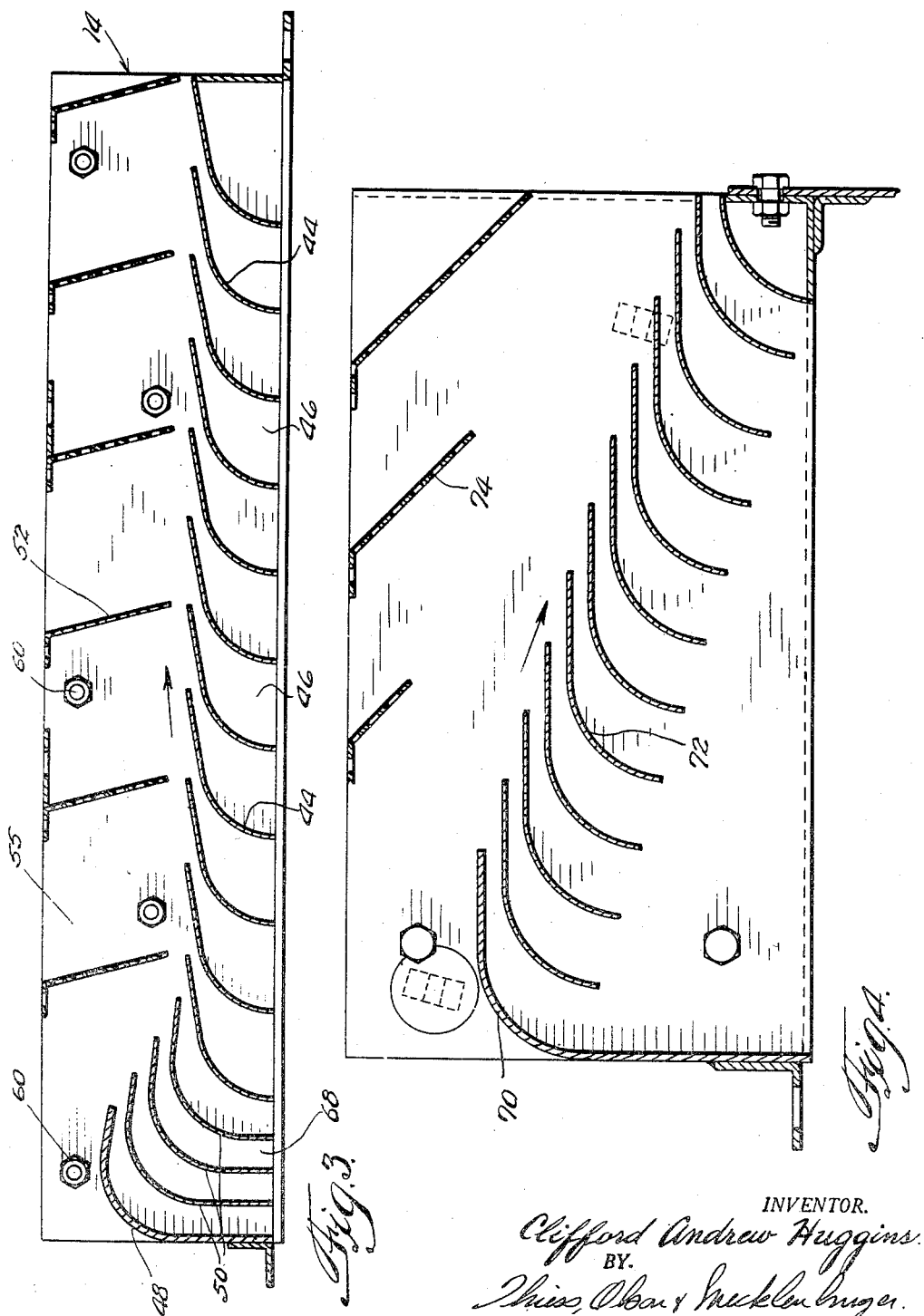

Aug. 7, 1956 C. A. HUGGINS 2,757,915
GAS-LIQUID CONTACT APPARATUS
Filed Aug. 23, 1951 4 Sheets-Sheet 3

INVENTOR.
Clifford Andrew Huggins.
BY
Thiess, Olson & Mecklenburger.

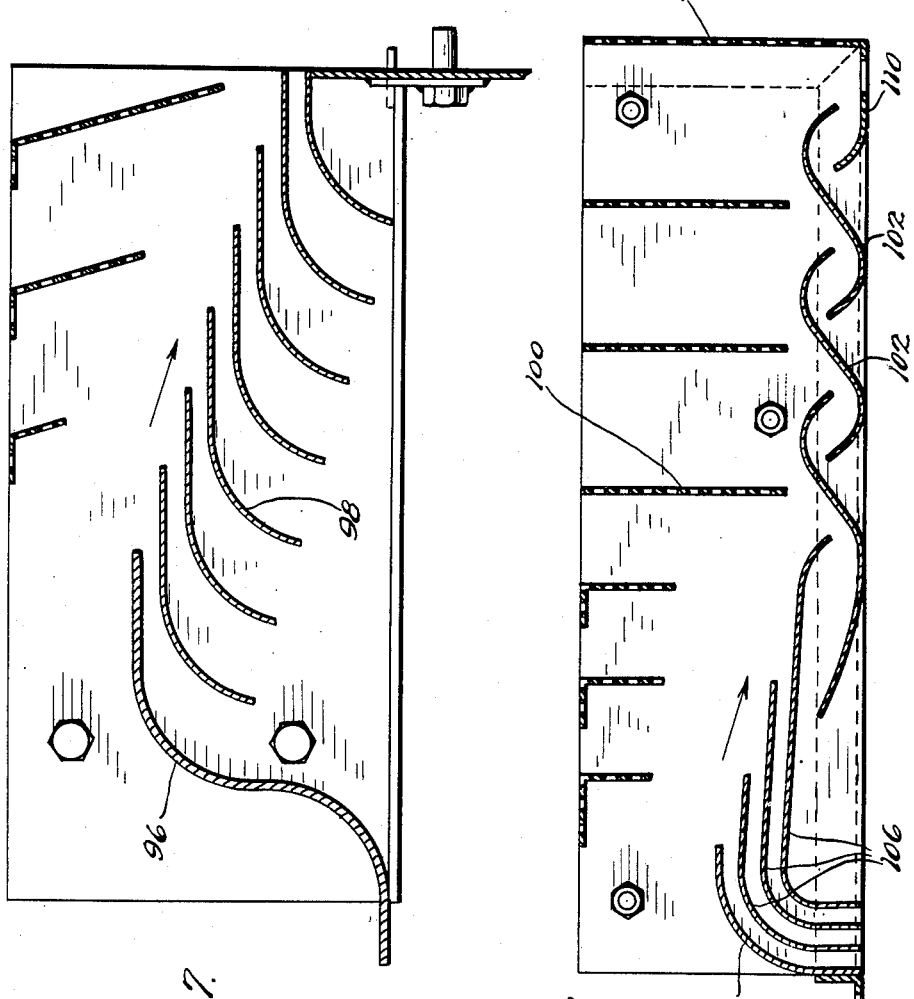

United States Patent Office 2,757,915
Patented Aug. 7, 1956

2,757,915

GAS-LIQUID CONTACT APPARATUS

Clifford Andrew Huggins, Wichita, Kans., assignor to Koch Engineering Company, Inc., Wichita, Kans., a corporation of Kansas Application August 23, 1951, Serial No. 243,240

2 Claims. (Cl. 261—114)

This invention relates to the gas-liquid contact art and has for an object the provision of apparatus for contacting gases with liquids.

In the gas-liquid contact art, and particularly the art of dephlegmation or fractionation, an important consideration is to provide equipment which will permit liquids and gases or vapors to be thoroughly contacted and then disengaged whereby gases or vapors and liquids are withdrawn from the equipment as separate products. In the past it has been the usual practice to provide a gas-liquid contact chamber or tower including a plurality of transverse trays through which the gases or vapors pass and over which the liquid flows. Such trays known to the art are the usual bubble trays, perforated trays, and the like. Many of the prior art trays, however, have not been entirely satisfactory since only limited quantities of liquid and gas can be passed through a tray of a given size and also because of the large pressure drops occurring across each individual tray.

Accordingly, it is one object of this invention to provide apparatus in which relatively large quantities of liquids and gases may be rapidly and efficiently contacted with each other.

A still further object of this invention is the provision of apparatus for intimately contacting liquids and gases in such a manner that only a small pressure drop occurs across the contacting section.

A still further object of this invention is the provision of a new and improved apparatus for the fractionation or dephlegmation of liquids, such as petroleum hydrocarbons.

A still further object of this invention is the provision of a gas-liquid contact tray which may be readily installed in conventional gas-liquid contacting towers or chambers.

A still further object of this invention is the provision of a gas-liquid contact tray which is simple to construct and which may readily be modified to conform to desired conditions within the tower whereby efficient gas-liquid contact is achieved.

Further and additional objects will appear from the following description, the accompanying drawings and the appended claims.

In accordance with one embodiment of this invention, a gas-liquid contact tray is provided which may be installed transversely in the usual type of fractionating or dephlegmating tower. The tray comprises a plurality of substantially parallel elongated baffle elements that are arranged to form a generally horizontal contact area over which the liquid flows. Each of the baffle elements are in the form of inverted troughs, preferably curvilinear in cross section, each having a lower surface lying within a generally vertical plane and an upper surface lying within a generally horizontal plane. The baffle elements are arranged in spaced overlapping relationship. In operation, vapors or gases pass upwardly through the tray between the elongated baffle elements and are diverted transversely across the upper surface of the tray in the direction of the normal flow of liquid thereover. The gases or vapors pick up the liquid by entrainment, thus causing a thorough contact between the liquid and the vapors or gases. In accordance with a preferred embodiment of the invention, the gases or vapors are projected onto the upper surface of the tray at a relatively high velocity thereby tending to hurl or jet the liquids across the tray surface. In this manner the liquid is moved rapidly over the surface, the gas-liquid contact is complete and the liquid capacity of the tray is greatly increased. If desired, a plurality of gas-liquid disengaging plates may be provided which extend in an upward direction and which have their lower edges spaced above the upper surfaces of the baffle elements. These plates may be perforated and provide surfaces against which the entrained liquid and gas are hurled whereby they become disengaged.

If desired, the baffle elements comprising the main body portion of the tray may be arranged in a horizontal plane with the gas discharge openings therebetween being directed in a direction inclined somewhat to the horizontal or the baffle plates may be arranged in downwardly stepwise relationship with the openings between them serving to discharge vapors over the surface of the tray in a substantially horizontal plane. The latter mode of construction may be preferred where it is desired to minimize the pressure drop occuring across each tray since gravity tends to assist the flow of liquid across the tray. In accordance with one embodiment of the invention, the transverse baffle elements are so arranged and spaced that the size of the openings between them on the under side of the tray has a ratio to the size of the restricted openings on the upper side of the tray of between about 2½ to 1 and about 24 to 1.

For a more complete understanding of this invention, reference will now be made to the accompanying drawings, wherein Fig. 1 is a fragmentary, somewhat diagrammatic sectional view of a gas-liquid contact tower embodying this invention;

Fig. 2 is a reduced sectional view taken substantially along the line 2—2 of Fig. 1;

Fig. 3 is an enlarged detail view of the contact tray shown in Figs. 1 and 2;

Fig. 4 is a detail sectional view of a modified form of contact tray;

Fig. 7 is a sectional view showing another modification, and

Fig. 8 is also a sectional view showing a still further modification.

Figure 5:
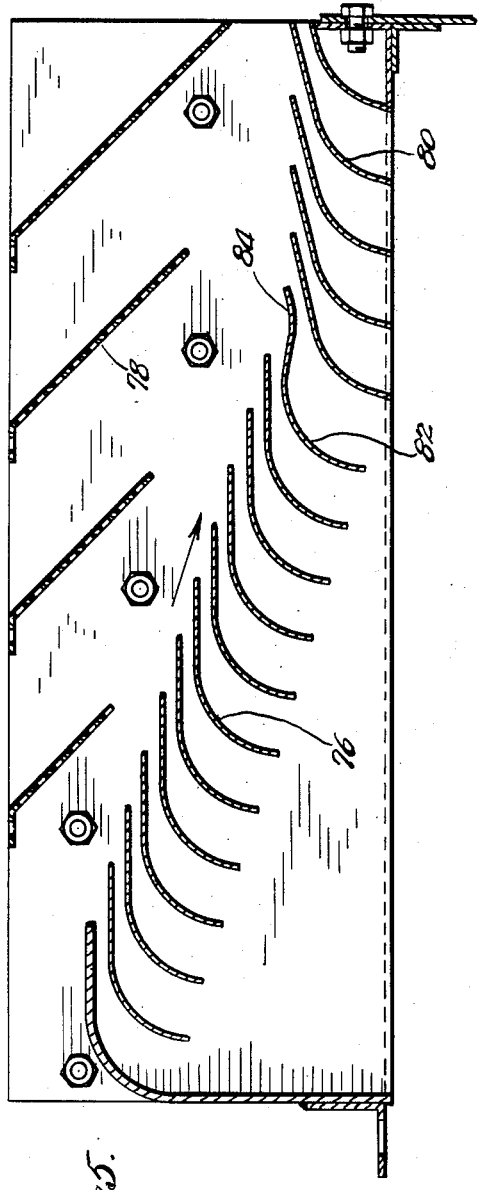
Fig. 5 is a detail sectional view of a tray constructed in accordance with another embodiment of this invention.

Referring now more particularly to Fig. 1, there is shown a conventional fractionating column or tower 10 having spaced trays 12, 14 and 16 positioned therein. These trays define a plurality of vertically spaced gas-liquid contact zones 18 and 20 through which vapors pass upwardly in the tower 10 in the manner hereinafter more fully to be described. Each of the trays 12, 14 and 16 are supported by means of conventional flanges 22 welded or otherwise secured to the tower 10. Also depending from the trays are baffle elements 24, 26 and 28 which in cooperation with the side walls of the tower 10 provide downcomers 30, 32 and 34 for the passage of liquid downwardly from tray to tray in a manner that will be understood. Adjacent the lower portions of the downcomers are seal pans 36, 38 and 40 which provide liquid seals and prevent the passage of vapors upwardly through respective downcomers. The seal pans may be provided with small drain holes 42 if desired. These drain holes are sufficiently small so that they will not adversely affect the operation of the equipment but are sufficiently large to permit the seal pans to drain when the equipment is not in use.

As most clearly shown in Fig. 3, each of the contact trays 12, 14 and 16 comprises a plurality of elongated horizontally arranged baffle elements 44 each positioned in spaced overlapping relationship. The series of the transversely extending baffle elements 44 extends in a substantially horizontal plane and provides a transversely interrupted contact surface over which liquid flows in operation. Each of the baffle elements 44 is curvilinear in transverse cross section and presents adjacent the lower edge a surface which lies within a generally vertical tangential plane and presents adjacent the upper edge a surface lying within a generally horizontal tangential plane. Thus it will be seen that the tray comprises a series of elongated openings 46, the several baffles being so shaped that the top of each opening is considerably more restricted than the bottom thereof. Thus when vapors pass upwardly through the openings 46 they initially move at a relatively low velocity but are jetted or hurled at a relatively high velocity over the surface of the tray in the general direction of the movement of the liquid thereover.

In the modification shown in Figs. 1, 2 and 3, the first baffle element 48 of each tray serves as a weir for the seal pan adjacent which it lies. The next three successive baffle elements 50 are stepped downwardly with the upper edge of each projecting out beyond the upper edge of the one immediately above so that liquid passing over the weir 48 has a tendency to cascade from the upper edge of one of the baffle elements 50 to the upper edge of the one next lower to it. Thereafter the liquid by virtue of the vapor moving at relatively high velocity through the openings 46 between the several baffle elements 50 and 44 is projected or hurled across the top of the tray in a manner that will be understood. Preferably a plurality of upwardly extending gas-liquid disengaging plates 52 running parallel to the baffle elements 44 and 50 may be provided. These plates 52 have their lower edges spaced above the upper edges of the baffle elements 44 to permit liquid to flow thereunder. However, any foam or mist that is motivated by the jetting action into the space between the plates 52 will be projected against one of them and the resulting impingement serves to disengage the gases from the liquids. Preferably the plates 52 are perforated with closely spaced apertures having a diameter of about ⅜ inch.

As will be apparent from a consideration of Figs. 1 and 2, each of the gas-liquid contact trays may be made up of a plurality of sections secured together in side-by-side relationship. Thus tray 14 comprises three separate sections 54, 56 and 58. The center section 56 is provided with planar side walls 55 and 57 to which the baffle elements 44 and 50 and the gas-liquid disengaging plates 52 are welded or otherwise secured. Each of sections 54 and 58 is provided with one flat side wall member 59 and one curved side wall member 61 which latter conforms to the circular shape of the tower in which the tray is installed. The several sections may be secured together by stud bolts 60 or any other convenient means and the entire tray 14 is secured within the tower 10 by means of suitable bolts 62 having a rigid flat head 64 for inserting under the circular flange 22 of the tower. The head 64 provides a surface which forms an acute angle with the main axis of the bolt so that when the bolt is drawn tight by the nut 66 a firm frictional purchase will be obtained, thus holding the tray firmly in position.

Thus even though the tray is made up of three separate sections, it in effect comprises a series of baffle elements and disengaging plates extending entirely across the opening in the tower. The end plates 55, 57, 59 and 61 of each section, when bolted or otherwise secured together and to the wall of the tower, serve in addition as transverse means for reinforcing the several baffle elements and plates.

In the operation of the device disclosed in Figs. 1, 2 and 3, gas or vapor is passed upwardly through the tower 10. With particular reference to tray 14, these gases or vapors move upwardly in the lower zone 20 to the under side of the tray. The vapors are prevented from escaping upwardly through the downpour 32 by virtue of the presence of liquid in the seal pan 38. Thus the vapors pass through the openings 46 between the baffle plates 44 as well as through the openings 68 between the baffle plates 50. Inasmuch as the openings 46 are enlarged on the under side of the tray but are restricted on the upper side of the tray, the vapors or gases greatly increase their velocity as they pass through the tray. Also their direction is changed so that there is provided in effect a plurality of parallel relatively high velocity flat streams of vapors which are discharged across the upper surface of the tray in generally the same direction of movement of the liquid across the upper surface of the tray.

While the vapors are passing through the tray 14 in the manner described above, liquid from the seal pan 36 passes over weir 48 and cascades downwardly across the tray over the upper surfaces of the baffle elements 50 and then onto the upper surfaces of the baffle elements 44. Due to the fact that vapors are moving at high velocity through the tray, the liquid cannot run down the surfaces of the baffle elements 44 into the zone 20 below. Therefore these vapors force the liquid to move from the upper surface of one baffle element to the next. At the same time a portion of this liquid is picked up by the relatively high velocity vapors to form a foam or mist which is projected against the surfaces of the plates 52 which serve to disengage the gases from the liquids. The gases then proceed upwardly through the zone 18 through the next tray where the operation is repeated. The disengaged liquids flow downwardly over the surface of the plates 52 and drop onto subsequent baffle plates 44 where they may be again picked up and hurled against a succeeding plate 52. It will also be apparent that if the volume of liquid flowing across the tray is relatively large there will be a certain percentage of it that is not hurled against the plates 52 but will move as a highly turbulent layer flowing clear across the tray where it is discharged to the succeeding downcomer 32 in the usual fashion.

In instances where it is desired to increase the amount of liquid flowed across each tray it may be advantageous to construct the disengaging plates 52 in such a manner that their lower edges are spaced further above the upper edges of the baffle plates 44 than indicated in the drawings. The same effect can be achieved by increasing the size and/or number of perforations in the plates 52 or slanting them further in the direction shown. The important thing to be kept in mind is that the more restrictions that are removed for the passage of gases and vapors, the less the pressure drop will be across the tray.

Additional modifications of this invention are disclosed respectively in Figs. 4 through 8. It will be understood that each of the trays detailed in these figures is constructed and adaptable for use in the type of contact tower shown in Figs. 1 and 2. However, for convenience and to avoid duplication, only the several trays are shown in Figs. 4 through 8 and no showing is made of the towers or related downcomers and seal pans.

With reference to Fig. 4, a tray is there shown comprising a weir 70 and a plurality of spaced elongated baffle elements 72 which are arranged in stepwise relationship. The passage of the liquid across this tray is generally horizontal although it is somewhat inclined to a true horizontal direction. The liquid cascades from the upper surface of one baffle element to the next in the general direction of the arrow while vapors at relatively high velocity tend to engage and hurl the liquid across the tray after which it falls into the next succeeding downcomer (not shown). The upper portion of each baffle element 72 lies in a plane that is horizontal, thereby providing a series of stepped surfaces over which the liquid readily flows. Vapor-liquid disengaging baffles 74 are also provided. In this instance, however, they are substantially inclined with respect to the vertical and have lower edges spaced considerably above the surface of the baffle elements 72. This being the case and because of the fact that the liquid is assisted by gravity in flowing over the surface of this tray, the pressure drop across the tray is very low and very efficient liquid-gas contact is achieved.

In Fig. 5 is shown another modified form of tray in which a plurality of baffle elements 76 are provided which are similar in shape and operation to those described above in connection with Fig. 4. Likewise similar disengaging plates 78 are provided. It will be noted, however, that in the right-hand section of this tray, as shown in the drawing, there are five baffle elements 80 which have the general configuration of the baffle elements 44 shown in Fig. 3. Thus this tray in certain respects combines certain features of the tray disclosed in Fig. 3 and of the tray disclosed in Fig. 4. It will be noted that the baffle plate 82 is provided with a shallow trough 84 on its upper surface. It has been found that this trough is important in preventing liquid run-back in the type of tray where liquid cascades downwardly from baffle element to element in one section of the tray but is flowed in a substantially horizontal direction over another section of the tray as disclosed in Fig. 5.

It will, of course, be understood that a fractionating tower or other gas-liquid contact chamber may be provided with trays all of the same type or with several different types of trays. As a matter of fact, the tray of Fig. 4 and the tray of Fig. 5 have been placed in the same three foot diameter tower, the trays of Fig. 4 being in the lower part of the tower and the trays of Fig. 5 being in the upper part of the tower.

Figure 6:
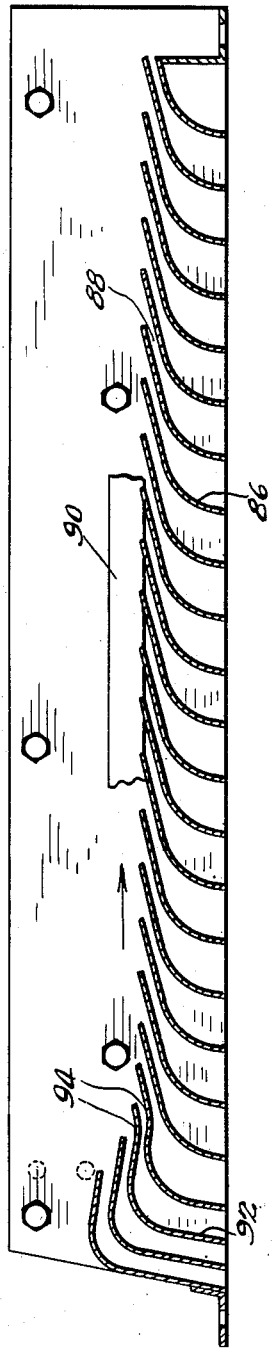
Fig. 6 is a detail sectional view of a contact tray constructed in accordance with still another embodiment of this invention.

Fig. 6 shows an additional modification which in certain respects is similar to the tray shown in Fig. 3. However, in this modification there are a large number of baffle elements 86 having their upper surfaces rather elongated so that elongated restricted passageways 88 are provided for jetting the vapors through the tray at relatively high velocities. In this modification the upper edges of the baffle elements 86 may be stiffened by a transverse stiffener bar 90 which is notched and welded or otherwise secured across the surfaces of the baffle elements. It will also be noted that the first few baffle elements 92 are arranged to provide a cascading effect for the liquid flowing therethrough and that two of them are provided with shallow troughs 94 which assist in preventing run-back of liquid through the tray. In one commercial application a tower was constructed having a large number of trays of this type. The lower trays had the construction shown in Fig. 6 in which the use of gas disengaging plates was eliminated. The upper sections of the tower were equipped with trays having a fairly large number of these gas-liquid disengaging plates of the character described in connection with the other figures. Intermediate trays in this commercial tower had a relatively fewer number of these gas-disengaging plates.

Fig. 7 shows a further modification in which the upper surface of the weir member 96 and the upper surfaces of the baffle plates 98 extend in a substantially horizontal direction and in which the liquid cascades downwardly from plate to plate as it passes over the surface of the tray. In this modification the vapor openings on the under side of the tray were about 2 inches wide, this being the distance between the lower edges of adjacent baffle elements 98. On the other hand the corresponding dimension of the restrictive opening in the upper surface of the tray was between about ¼ and 5/16 of an inch. For effective commercial operations, as pointed out above, it is preferred that the ratio of these openings be within the range of about 2½ to 1 and about 24 to 1 depending upon the volumes of liquids and gases that are to be contacted in the apparatus. Because of the stepwise relationship of the several baffle elements 98, a tower having trays of the character shown in Fig. 7 will carry relatively large liquid loads and the long tangential surfaces provided at the upper ends of each baffle element give a severe thrust to the liquid passing over the tray by the vapors passing therethrough at high velocities.

With reference to Fig. 8, there is shown an additional modification which is somewhat similar to that disclosed in my copending application Serial No. 190,973, filed October 19, 1950, now Patent No. 2,693,949 of November 9, 1954, of which this application is a continuation-in-part. Fig. 8 depicts a tray wherein the gas-liquid disengaging plates 100 have their lower edges spaced vertically above overlapping baffle elements 102, the latter having an S-shaped cross section. In this modification a portion of the vapors passing through the tray passes between the several elements 102 as disclosed in my copending application and the spacing of the plates 100 above the elements 102 permit a larger volume of liquid to flow over the tray with a lower pressure drop. The tray shown in Fig. 8 is in addition provided with a weir member 104 and inductor baffles 106 which operate in substantially the same manner as the inductor baffles 50 shown in Fig. 3 providing vapor or gas means for thrusting liquid over the surface of the tray. It will be noted that at the far right-hand end of the tray the gas disengaging plate 108 is secured to and forms a part of a baffle flange 110 and disengaged liquids fall downwardly from the plate 108 into the next successive downcomer (not shown).

Thus it will be seen that an efficient process and tray have been provided for contacting gases and liquids. The invention is particularly useful in the art of fractionation or distillation where it is desired to separate large quantities of liquids and vapors with a minimum pressure drop across the equipment. As will be apparent from the foregoing discussions, the specific trays may be readily modified to take care of various desired conditions of operation and this is an important feature of this invention. For example, the upwardly extending disengaging baffles above the tray may be positioned, perforated or slanted to control the pressure drop. These baffles tend to keep the liquid on the tray and their use permits better liquid-gas separation. Likewise the operating characteristics of the tray may be adjusted by controlling the spacing between the various baffle elements and the relative size of the upper and lower openings in the tray. More restricted upper openings impart more thrust to the liquid moving over the tray resulting in more thorough contact but with increased pressure drop.

While several particular embodiments of this invention are shown above, it will be understood, of course, that the invention is not to be limited thereto, since many modifications may be made, and it is contemplated, therefore, by the appended claims, to cover any such modifications as fall within the true spirit and scope of this invention.

I claim:

1. A gas-liquid contact tray having a liquid-receiving end and a liquid-discharge end for flowing a liquid across the upper surface thereof comprising a first group of spaced elongated baffle plates adjacent the liquid-receiving end arranged in successively downwardly stepped relationship in the direction of the normal movement of liquid across said tray and a second group of spaced elongated baffle plates adjacent the liquid-discharge end having their longitudinal axes substantially within the same horizontal plane and having their upper portions slightly inclined upwardly whereby an initial thrust is given to liquid across said tray by said first group, each of the plates of said first and second groups having a curvilinear cross section with the lower portion thereof arranged in an upwardly extending plane and with the upper portion thereof lying within a transverse plane, said upper portions of said baffle plates overlapping the corresponding portions of adjacent baffle plates, the overlapping portions being spaced more closely together than the lower portions of the corresponding plates thereby forming passageways through said tray which direct gas from underneath said tray across the upper surface thereof in the direction of movement of said liquid between said ends whereby movement in said direction is assisted.

2. The tray recited in claim 1 wherein at least one baffle plate between said first group and said second group is provided with a longitudinally-extending upright, shallow trough on the upper surface thereof for preventing liquid run-back through said tray.

References Cited in the file of this patent

UNITED STATES PATENTS

| | | |
|---|---|---|
| 468,919 | Rettenmeyer | Feb. 16, 1892 |
| 489,147 | Golding | Jan. 3, 1893 |
| 581,439 | Sneath | Apr. 27, 1897 |
| 764,049 | Guldlin | July 5, 1904 |
| 829,700 | Drees | Aug. 28, 1906 |
| 1,319,572 | Di Sante | Oct. 21, 1919 |
| 1,434,301 | Liljegran | Oct. 31, 1922 |
| 1,748,595 | Chillas et al. | Feb. 25, 1930 |
| 2,051,545 | Collins | Aug. 18, 1936 |
| 2,091,349 | Bergman | Aug. 31, 1937 |
| 2,116,933 | Ragatz | May 10, 1938 |
| 2,568,749 | Kittel | Sept. 25, 1951 |
| 2,678,201 | Koch | May 11, 1954 |
| 2,681,219 | Thrift et al. | June 15, 1954 |

FOREIGN PATENTS

| | | |
|---|---|---|
| 839,695 | France | Jan. 7, 1939 |